(12) United States Patent
Walters, Jr. et al.

(10) Patent No.: US 6,517,880 B2
(45) Date of Patent: *Feb. 11, 2003

(54) BEVERAGE BREWING SYSTEM AND METHOD FOR USING SAME

(75) Inventors: Lawrence S. Walters, Jr., Woodbridge, CT (US); Irl R. Sanders, III, Wilbraham, MA (US); Dennis C. Bernardi, Wallingford, CT (US)

(73) Assignee: Kx Industries, L.P., Orange, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/483,106

(22) Filed: Jan. 14, 2000

(65) Prior Publication Data

US 2002/0059870 A1 May 23, 2002

(51) Int. Cl.[7] .............................. A23F 5/24; A23L 31/10; A23L 31/44
(52) U.S. Cl. ........................ 426/433; 426/435; 99/279
(58) Field of Search ................... 426/433, 435; 99/279

(56) References Cited

U.S. PATENT DOCUMENTS

| | | | |
|---|---|---|---|
| 3,405,630 A | | 10/1968 | Weber, III ................... 99/282 |
| 3,804,635 A | | 4/1974 | Weber ......................... 99/283 |
| 5,239,914 A | | 8/1993 | Salomon et al. |
| 5,287,797 A | * | 2/1994 | Grykiewicz et al. |
| 5,393,548 A | | 2/1995 | Heiligman ................... 426/433 |
| 5,505,120 A | | 4/1996 | Albertson .................... 99/286 |
| 5,556,461 A | * | 10/1996 | Lehrer |
| 5,792,513 A | * | 8/1998 | Koslow et al. |
| 5,885,633 A | * | 3/1999 | Lehrer |
| 5,957,034 A | | 9/1999 | Sham et al. ................... 99/285 |
| 5,970,849 A | | 10/1999 | Baumann et al. ............. 99/299 |
| 6,000,317 A | | 12/1999 | Van Der Meer .............. 99/282 |
| 6,103,116 A | * | 8/2000 | Koslow et al. |
| 6,158,328 A | * | 12/2000 | Cai |

FOREIGN PATENT DOCUMENTS

| | | |
|---|---|---|
| EP | 0 958 771 A1 | 11/1999 |
| WO | WO 99/53813 | 10/1999 |

* cited by examiner

Primary Examiner—Anthony J. Weier
(74) Attorney, Agent, or Firm—Ohlandt, Greeley, Ruggiero & Perle LLP; Shirley S. Ma (57) ABSTRACT

A system for brewing a beverage from a liquid. The system preferably has a device for steeping brewing ingredients in a liquid. The liquid is delivered to the steeping device through a contaminant removing device, such as a filter. The contaminant removing device is alternatively disposed, by way of a positioning device, either between the liquid supply and the steeping device or in a position wherein the contaminant removing device can be dried, cleaned, or replaced. A method of using such a system is also provided.

32 Claims, 8 Drawing Sheets

BEVERAGE BREWING SYSTEM AND METHOD FOR USING SAME

FIELD OF THE INVENTION

The present invention relates to a system capable of removing contaminants in a liquid and a method for using such a system. More particularly, this invention relates to a brewed beverage making system capable of removing contaminants from a liquid used to brew beverages.

BACKGROUND OF THE INVENTION

Devices of various configurations for removing contaminants from liquids are employed daily in households. The term removing as used herein encompasses separating, absorbing, adsorbing, capturing, binding, altering, transforming, rendering inert, and destroying.

In most households, coffee, tea, and other brewed beverages are typically made in an automatic drip-type beverage maker. Such beverage makers typically have a reservoir of liquid, such as water, and heat the liquid with a thermosiphon heater. The heated liquid is delivered to a brewing basket that contains the brewing ingredients, wherein the heated liquid steeps in the brewing ingredients. The resulting brewed beverage passes through the brewing basket into a beverage collector, or carafe, positioned below. The beverage collector is typically kept warm by a heating element.

Water and other liquids used in these drip-type beverage making systems can contain contaminants. These contaminants include particulates, chemicals, and germs (i.e., viruses, bacteria, mold, pollen, oocysts, and protozoa). Common liquid-borne particulate contaminants are dirt, rust, silt, and heavy metals. Lead, a heavy metal, is particularly common because it is found in water fixtures, pipes, and pipe solder. Chemical contaminants may consist of chlorinated hydrocarbons, free chlorine, pesticides, petroleum-based chemicals, and synthetic organic chemicals. Germs that commonly contaminate water include protozoan cysts, such as *Cryptosporidium Parvum* and Giardia, and bacteria, such as *E. coli* and Cholera. Thus, not only will contaminants noticeably and adversely affect the aroma, taste, and other qualities of the brewed beverage, contaminants are also potentially dangerous to the brewed beverage drinker.

The typical brewing basket found in most beverage makers has an inverted frustoconical shape and supports a fluted or pleated bowl-shaped paper filter or metal, open-mesh screen that generally conforms to the inverted frustoconical shape of the brewing basket. The principal function of the paper or open-mesh filter is to support the brewing ingredients and prevent them from passing into the underlying beverage collector. Thus, the paper or metal filter that is held in the brewing basket generally does not remove liquid-borne contaminants.

A contaminant remover must be employed to remove, or otherwise render inert, any contaminants in the liquid, ideally, before the liquid contacts the brewing ingredients. Yet, if a user finds the contaminant remover inconvenient to use, the user is likely to discontinue using, cleaning, or changing it. Moreover, if the contaminant remover is not integrated with the brewed beverage maker, the contaminant remover is likely to be lost or damaged.

U.S. Pat. No. 3,405,630 (R. L. Weber III) discloses a water filter disposed in the path of flow between an independently claimed water-heating vessel and a coffee infusion chamber. The specification of the Weber '630 patent provides that the coffee maker is configured to receive the water filter by means of a threaded retaining ring. Since the water filter is threaded into the coffee maker, access thereto is not very convenient for the user. Also, after the water filter is installed, it is hidden within the coffee maker. Thus, there is a great likelihood that the filter will be either forgotten or not replaced regularly by the user.

U.S. Pat. No. 3,804,635 (Weber) provides a system having filtering material, such as activated carbon, located between the heating chamber and the coffee basket. However, the Weber '635 patent does not provide that the filter material can be changed or cleaned by the user. More appropriately, this patent also discloses a coffee maker having a water filter at the inlet to the heating chamber. While only partially explained by the specification, changing the water filter element appears to require unscrewing a guide shaft, inserting the filter element, turning the element to securely lock it to the coffee maker, and then re-attaching the shaft. Clearly, this is not a convenient system and, moreover, the filter element is not integrated with the coffee maker. Thus, the user is likely not to install, clean, or change the filter element, and the filter element is likely to be lost or damaged.

U.S. Pat. Nos. 5,393,548 and 5,505,120 provide similar methods and devices for increasing the convenience of water filters for coffee makers. First, U.S. Pat. No. 5,393,548 (Heiligman) discloses a method wherein a water filtration device is positioned between the hot water drip outlet and the ground coffee beans. The specification provides a water filtration device having support feet. In use, the water filtration device is inserted into the brewing basket such that the support feet rest on the ground coffee beans. Second, U.S. Pat. No. 5,505,120 (Albertson) discloses a system for brewing coffee having a basket for accommodating coffee grounds and a filter means located in the basket. Like the Heiligman patent, the Albertson patent provides that the filter means is placed on top of the coffee grounds.

These designs suffer from several drawbacks. First, the filter device, or contaminant remover is positioned in very close proximity to the coffee grounds. Accordingly, the contaminant remover can become tainted with wet coffee grounds, thus, requiring that the contaminant remover be cleaned after each use, which is clearly inconvenient. Moreover, because the prior art designs dispose the water filter between the water reservoir and the brewing basket, but not connected to either, each time coffee is made, the filter must be removed and repositioned. In some household or work environments, several batches of coffee are made each day and the removal, cleaning and repositioning of the filter can become a major inconvenience.

The prior art illustrates that, although many different beverage brewing systems presently exist, there is still a need for a beverage brewing system with a contaminant remover that is convenient to install, use, clean, and replace. In addition, a need exists for a beverage brewing system with a contaminant remover that will not be lost or damaged.

SUMMARY OF THE INVENTION

There is provided a system for removing contaminants from liquids. This system is preferably used for brewing beverages. The system employs a contaminant remover to remove impurities in a liquid prior to mixing the liquid with brewing ingredients contained in a brewing basket. The contaminant remover is convenient to install, use, clean, or replace because it is independently accessible relative to the brewing basket. A method for using the system is also provided.

DETAILED DESCRIPTION OF THE INVENTION

Figure 1:
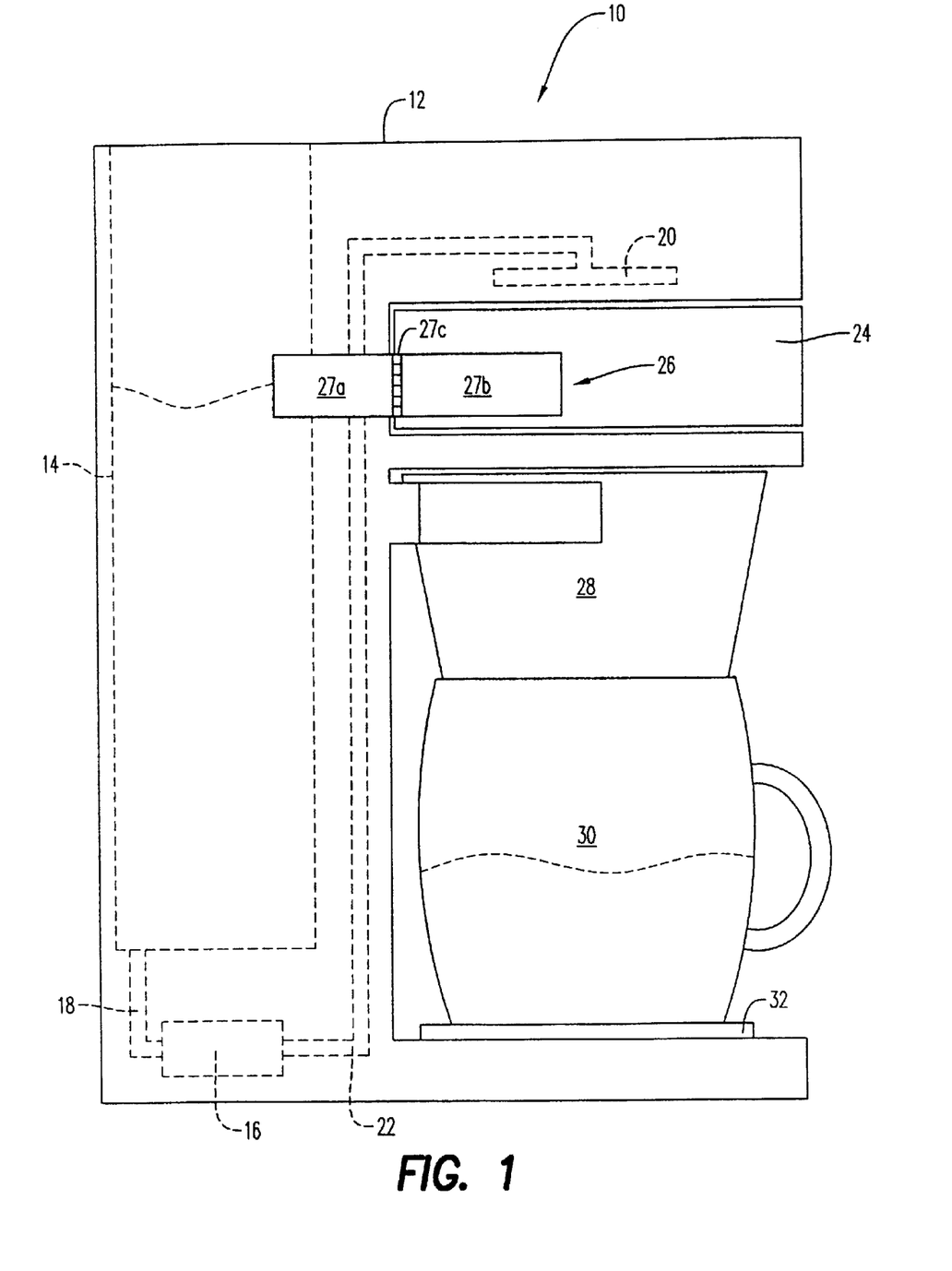
FIG. 1 is a side projection view of a preferred embodiment of a beverage brewing system incorporating the unique contaminant remover of the present invention.

FIG. 1 illustrates an embodiment for a beverage brewing system 10 according to the present invention. Beverage brewing system 10 is generally formed by a housing 12. Housing 12 has a reservoir 14 disposed therein for holding liquids, such as water. Reservoir 14 is connected to a heater 16 by a conduit 18, while heater 16 is connected to an outlet 20 by a conduit 22. However, other means for supplying hot water through outlet 20 may be provided instead of reservoir 14, heater 16, and conduits 18 and 22. For example, outlet 20 may be connected directly to a hot water faucet. Outlet 20 is positioned above a contaminant remover 33 (not shown), e.g. a filtration medium. A supporting device 24 supports contaminant remover 33.

Preferably, supporting device 24 is an annular structure (see FIG. 3D) having an outer wall 46 and an inner wall 48. A ledge 50 extending inwardly from inner wall 48 is adapted to receive contaminant remover 33. Inwardly-extending supports (not shown) may span the opening of annular structure 46 to underpin contaminant remover 33. Such inwardly-extending supports may be disposed in any suitable pattern, such as a lattice.

Ledge 50 of supporting device 24 also preferably has a groove 56 adapted to receive frame 54. Grove 56 and frame 54 may be designed so as to tightly mate and, thus, create a watertight seal. A watertight seal will ensure that all liquid directed to contaminant remover 33 will indeed pass therethrough. Likewise, since liquid may exit outlet 20 more quickly than it can pass through contaminant remover 33, a reservoir, or reserve space, may be created above contaminant remover 33. The capacity of the reservoir is defined by a distance d (see FIG. 3E), which is between a top rim 51 of annular structure 46 and receiving ledge 50 (see FIG. 3D or 3E), multiplied by the area of annular structure 46. The areas of annular structure 46 and contaminant remover 33 should be made as large as reasonably possible within the practical constraints of the brewed beverage maker, while distance d should be configured to provide enough reserve capacity to prevent the overflow of liquid. Distance d will depend on the flow rate of water through contaminant removing medium 52 and the flow rate of liquid from outlet 20.

Supporting device 24 is attached to housing 12 by an assembly, shown generally as 26, which allows supporting device 24 to be disposed alternatively in an operative or inoperative position relative to outlet 20. Preferably, supporting device 24 is removably attached to housing 12. In the operative position, assembly 26 disposes supporting device 24 below outlet 20. In the inoperative position, supporting device 24 may be accessed for the purpose of installing, cleaning, or replacing contaminant remover 33. Preferred embodiments of assembly 26 are described below.

Furthermore, when supporting device 24 is in the operative position, a brew basket 28 may be positioned below supporting device 24. Brew basket 28 may hold one or more brewing ingredients, such as coffee grounds, tea leaves, and/or spices. Preferably, brew basket 28 is removably attached to housing 12. A collector 30, typically a carafe, may be positioned below brew basket 28. Like most commercially available beverage brewers, beverage brewing system 10 may be provided with a heating surface 32 upon which collector 30 may rest and whereby the collected beverage may be kept warm.

Figure 2A:
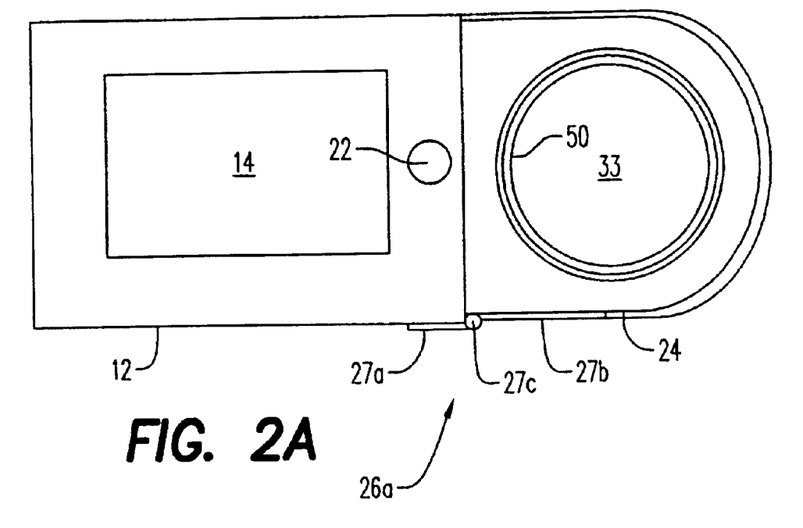
FIG. 2A is a top plan view of the beverage brewing system of FIG. 1 illustrating the operative position for a preferred embodiment of the supporting device for the contaminant remover.
Figure 2B:
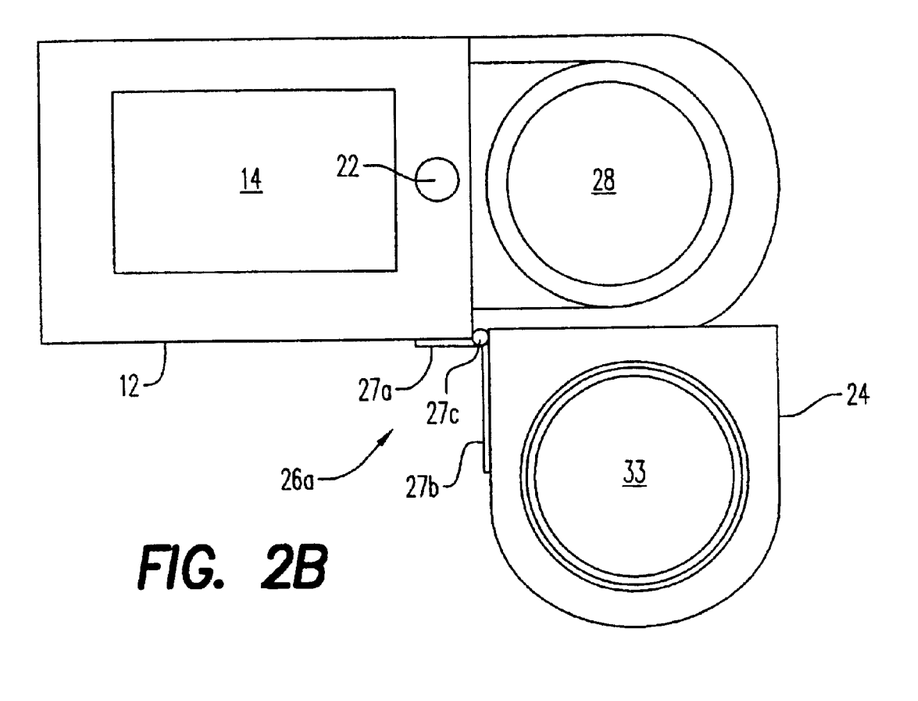
FIG. 2B is a top plan view of the beverage brewing system of FIG. 1 illustrating the inoperative position of the supporting device of FIG. 2A.

Referring to FIGS. 2A and 2B, supporting device 24 is illustrated with a first preferred embodiment of assembly 26, hereinafter referred to generally as 26a. Support assembly 26a is a hinge device having a first panel 27a connected to housing 12, a second panel 27b connected to supporting device 24, and a pivoting pin 27c joining the two panels 27a, 27b together. Assembly 26a permits supporting device 24 to be pivoted about pivoting pin 27c between the operative position, illustrated in FIG. 2A, which places contaminant remover 33 under outlet 20 and over brew basket 28 (as shown in FIG. 1), and the inoperative position, illustrated in FIG. 2B, which allows access to supporting device 24 and contaminant remover 33. Since the various components of commercial beverage brewers are usually made from molded thermoplastic materials, panels 27a, 27b may be made integral to beverage brewing system 10. Those skilled in the art will also appreciate that variations can be made to the materials and construction of the hinge components without deviating from the spirit of the invention.

Figure 3A:
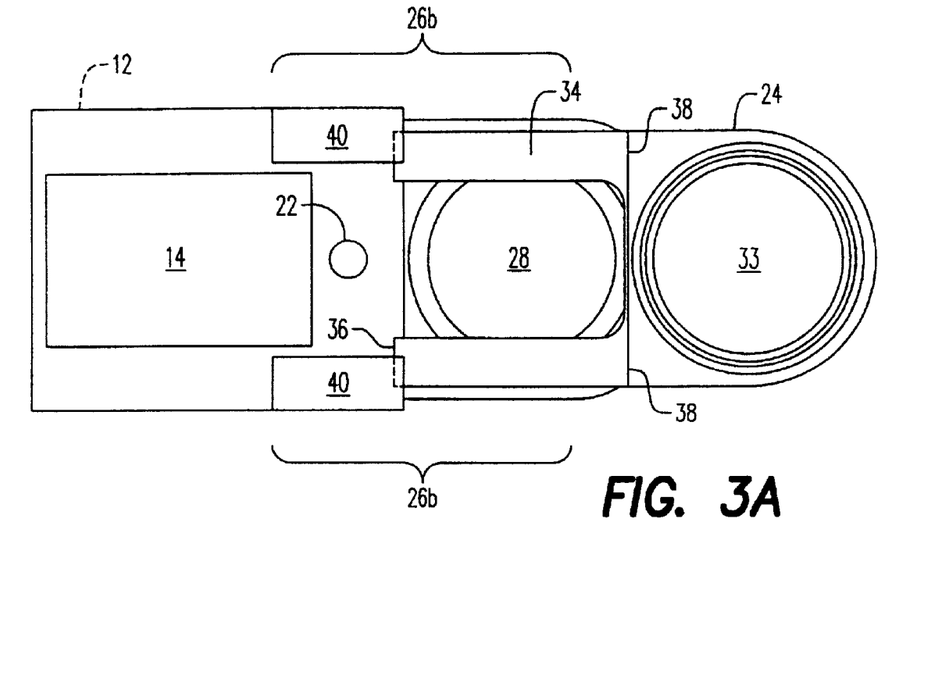
FIG. 3A is a top plan view of the beverage brewing system of FIG. 1 illustrating the inoperative position for another preferred embodiment of the supporting device.
Figure 3B:
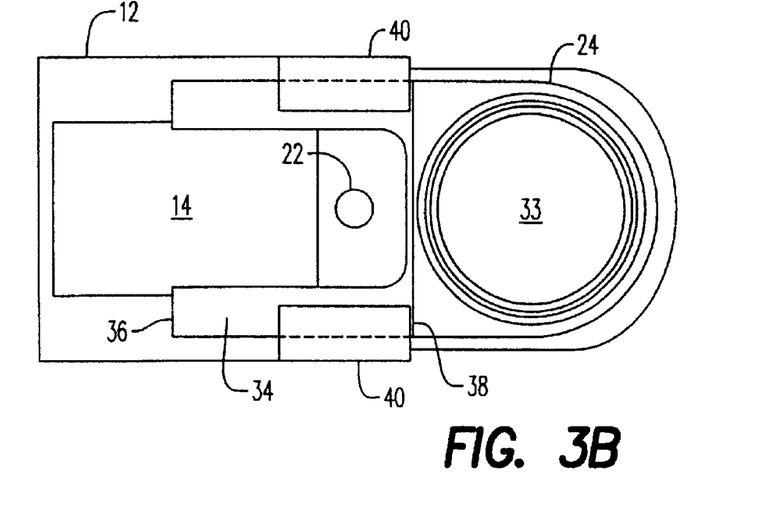
FIG. 3B is a top plan view of the beverage brewing system of FIG. 1 illustrating the operative position for the supporting device of FIG. 3A.
Figure 3C:
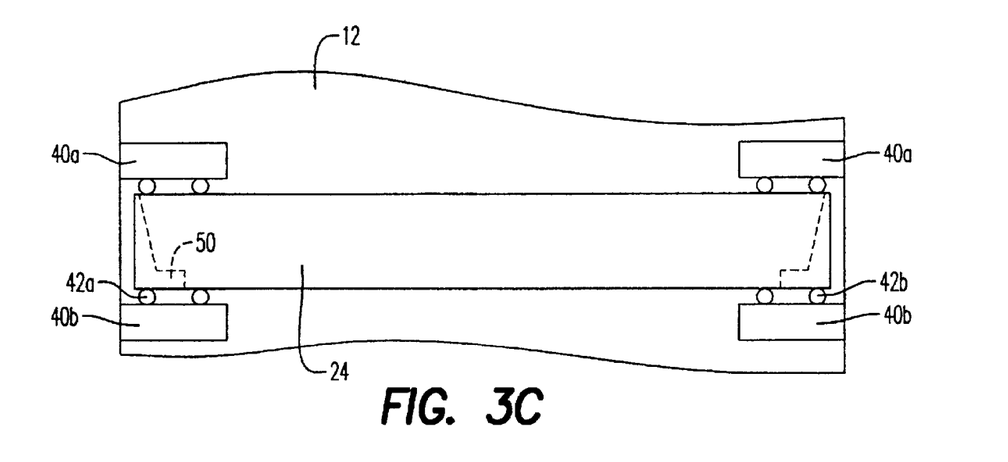
FIG. 3C is a front view of the supporting device of FIG. 3A.
Figure 3D:
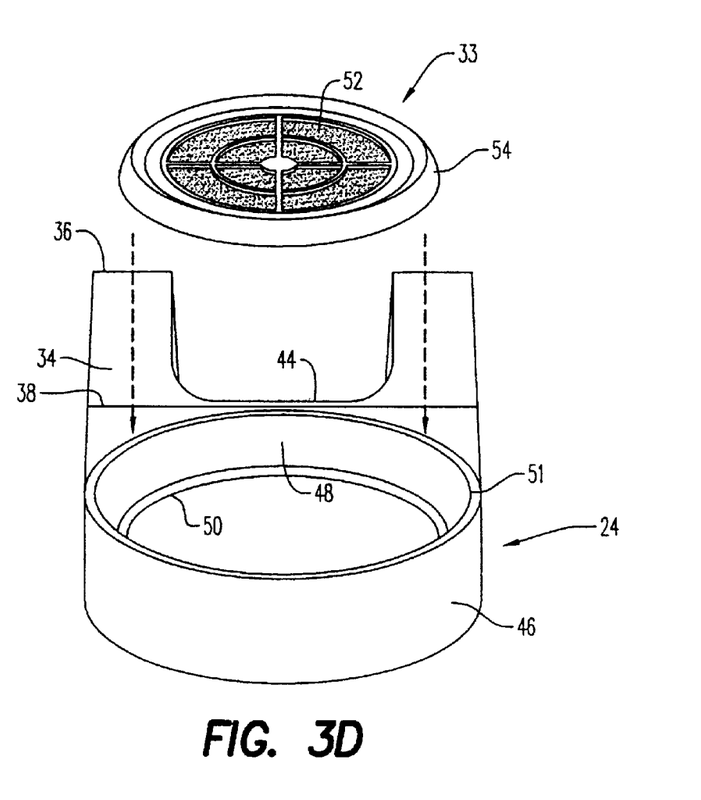
FIG. 3D is a front, perspective, exploded view of the supporting device of FIG. 3A and a preferred embodiment of a contaminant remover for use therewith.
Figure 3E:
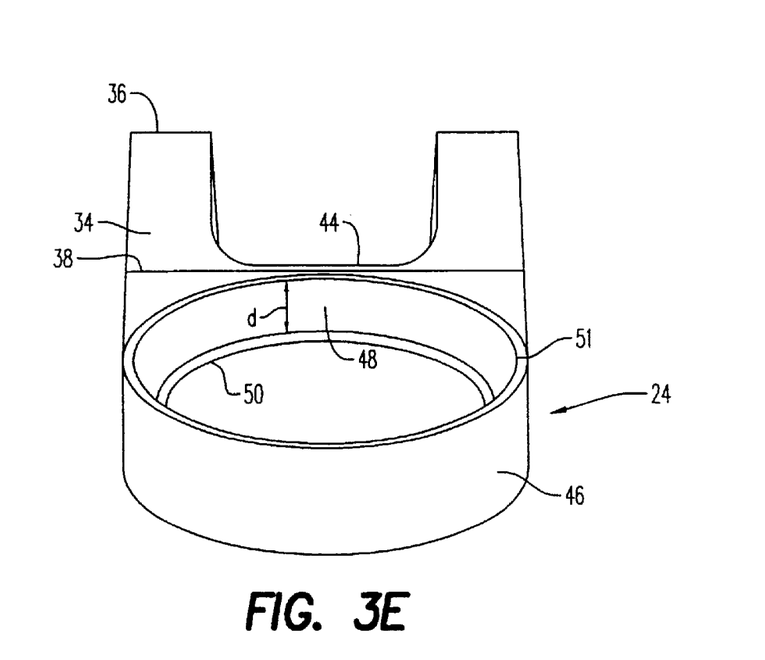
FIG. 3E is a front, perspective, view of the supporting device of FIG. 3A.

FIGS. 3A through 3E illustrate a second preferred embodiment of assembly 26, hereinafter referred to generally as 26b. Assembly 26b is formed, in part, by a panel 34 having a near end 36 and a remote end 38. Supporting device 24 is attached to remote end 38. Panel 34 is slidingly supported in housing 12 by bearing surfaces 40a, 40b, which are affixed to housing 12. Alternatively, panel 34 may be releasably, slidingly received within said housing in a manner (not shown) resembling the way a cartridge in releasably, slidingly fastened within a base. A spring-like device (not shown) could be adapted to housing 12 for the purpose of ejecting panel 34 from housing 12. Bearings 42a, 42b (see FIG. 3C) may be positioned between bearing surfaces 40a, 40b and near end 36 to reduce the sliding friction. Optionally, bearing surfaces 40a, 40b may be lubricated or made from a material which has a low coefficient of friction compared to the material forming panel 34. Optionally, near end 36 has a large notch 44 provided therein so that panel 34 will not obstruct access to reservoir 14 or the flow of hot water in conduit 22 when panel 34 is in the operative position, as shown in FIG. 3B. Supporting device 24 and panel 34 may be made as a single piece of molded thermoplastic. Alternatively, supporting device 24 and panel 34 may be constructed by other suitable methods, using other suitable materials known to the art, such as metal.

Figure 5A:
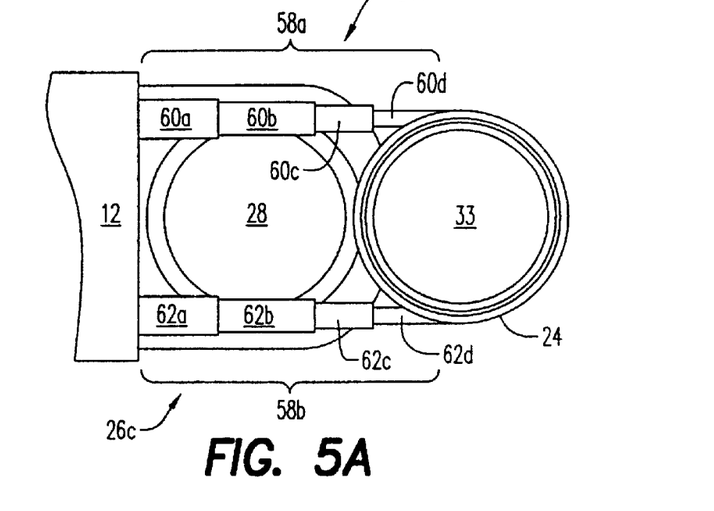
FIG. 5A is a top plan view of the beverage brewing system of FIG. 1 illustrating the inoperative position for a third embodiment of the supporting device.
Figure 5B:
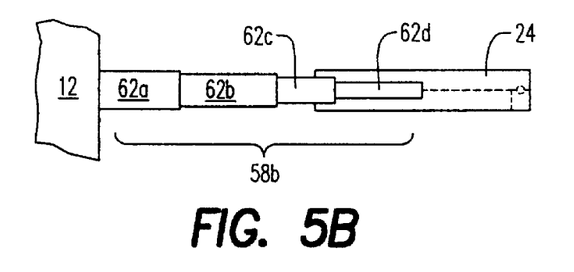
FIG. 5B is a side plan view of the supporting device of FIG. 5A.
Figure 5C:
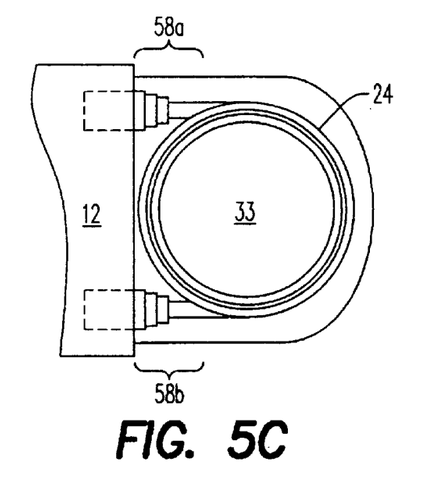
FIG. 5C is a top plan view of FIG. 1 illustrating the operative position for the supporting device of FIG. 5A.
Figure 5D:
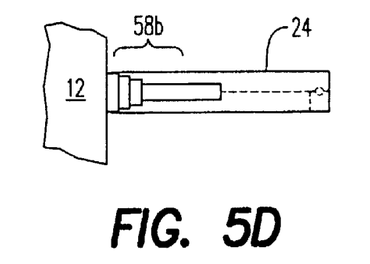
FIG. 5D is a side plan view of FIG. 5C.

FIGS. 5A through 5D show a third embodiment of support assembly 26, hereinafter referred to generally as 26c. In this embodiment, support assembly 26c is a pair of telescoping arms 58a, 58b that permit supporting device 24 to slide between the inoperative position, illustrated in FIGS. 5A and 5B, and the operative position as illustrated in FIGS. 5C and 5D. Telescoping arms 58a and 58b each comprise four segments, shown respectively as 60a–60d and 62a–62d. Of course, a greater or lesser number of arm segments can be used. First end segments 60a and 62a are connected to housing 12, and second end segments 60d and 62d are connected to supporting device 24. The remaining segments 60b, 60c and 62b, 62c are connected telescopically between their respective end segments. First end segments 60a, 62a and second end segments 60d, 62d can be integrally molded with housing 12 and supporting device 24, respectively.

Figure 6A:
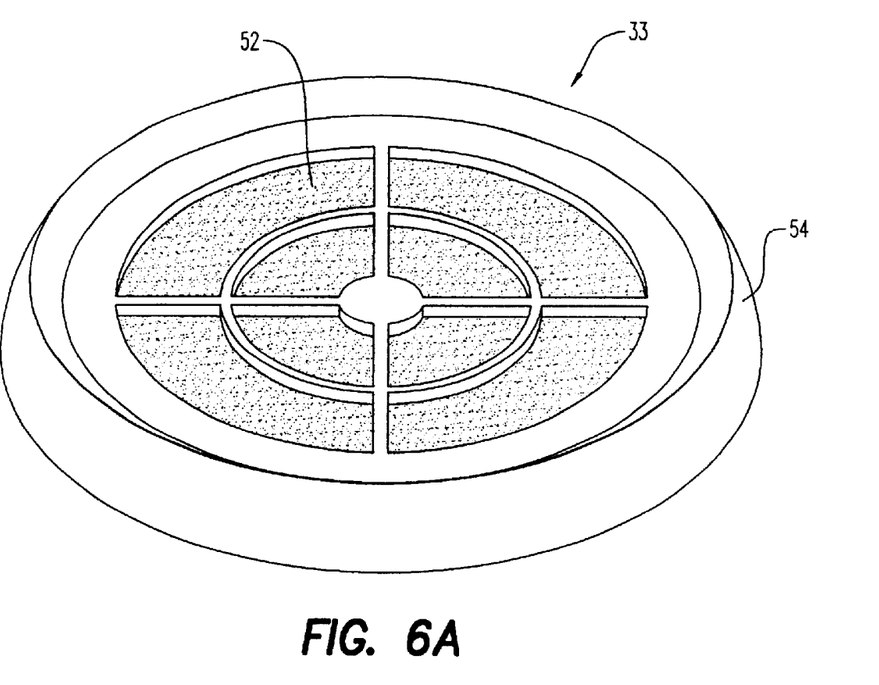
FIG. 6A is a perspective view of a preferred contaminant remover according to the present invention.

Referring to FIGS. 3D and 6A, there is illustrated a contaminant remover 33 for use with supporting device 24. Contaminant remover 33 is preferably configured as a frame 54 supporting a filter medium 52 (see also FIG. 6A).

Frame 54 is preferably injection molded around filter medium 52. Consequently, frame 54 may be molded in numerous configurations. FIGS. 3D and 6A illustrate preferred configurations for frame 54. As shown, frame 54 is an annular, peripheral rim with a plurality of inwardly extending members. These configurations resemble spoke and wheel arrangements with filter medium 52 held securely within.

Injection molding frame 54 around filter medium 52 involves, first, forming filter medium 52 as described below. Second, the periphery of filter medium 52 is hot stamped, which seals the edges of filter medium 52. Filter medium 52 is then cut to shape and inserted into an injection molding machine. A thermoplastic material is then injected around filter medium 52. Preferably, the thermoplastic material is polyethylene. It has been discovered that polyethylene offers a preferred balance between strength and flexibility. However, any thermoplastic material may be used. Hot stamping and cutting filter medium 52 may be accomplished in one integrated step, rather than two separate steps.

Figure 4A:
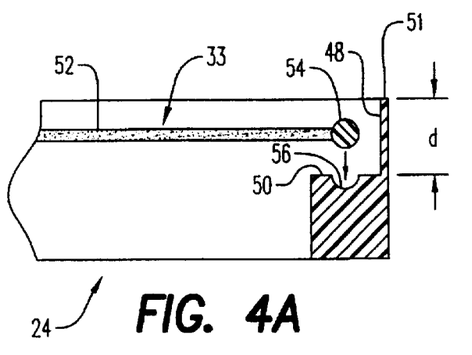
FIG. 4A is a partial cross-sectional view of a means for connecting the contaminant remover to the supporting device.
Figure 4B:
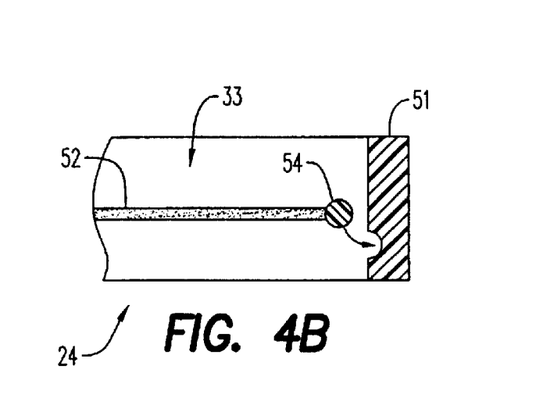
FIG. 4B is a partial cross-sectional view of another means for connecting the contaminant remover to the supporting device.
Figure 6B:
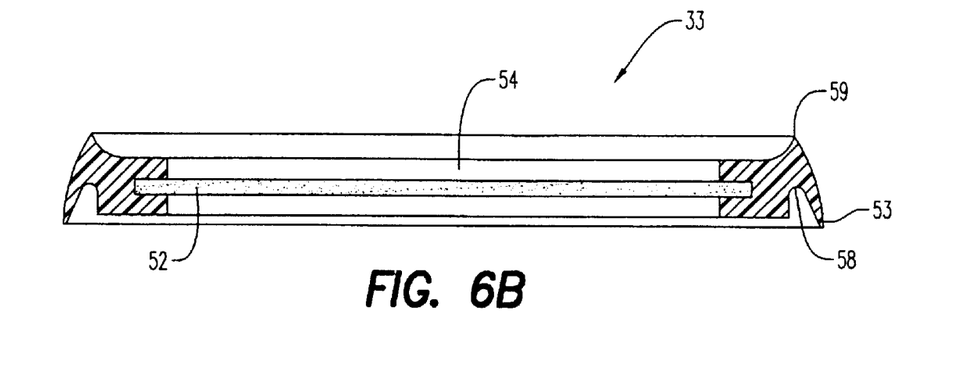
FIG. 6B is a cross-sectional view of the contaminant remover of FIG. 6A.

As stated above, filter frame 54 is adapted to rest upon receiving ledge 50 (see FIGS. 3D and 4A) when contaminant remover 33 is placed within supporting device 24. Alternatively, filter frame 54 may be adapted to rest within a receiving notch, as illustrated in FIG. 4B. Referring to FIG. 6B, frame 54 may also be provided with a downwardly-extending protrusion 53 designed to fit within a complementary groove (not shown) in receiving ledge 50. Moreover, frame 54 may have an upwardly extending protrusion 59 adapted to mate with complementary groove 58 in another frame 54. Thus, multiple frames may be stacked for packaging and display purposes.

Filter medium 52 is shown in FIG. 6A. Filter medium 52 may be of any type including separating mediums and adsorbing mediums. For example, metallic mesh screens, spun-bonded or melt-blown polymeric non-woven materials, glass fibers, porous membranes, and paper may be used as separating mediums. Adsorbing mediums include iodinated resin, activated carbon, activated alumina, alumina-silicates, ion-exchange resins, manganese or iron oxides, and other materials having well-defined pore structures due to a high degree of crystallinity, such as zeolites. Preferably, filter medium 52 provides suitably high flow and minimal pressure drop, when liquid in passed therethrough.

Figure 7A:
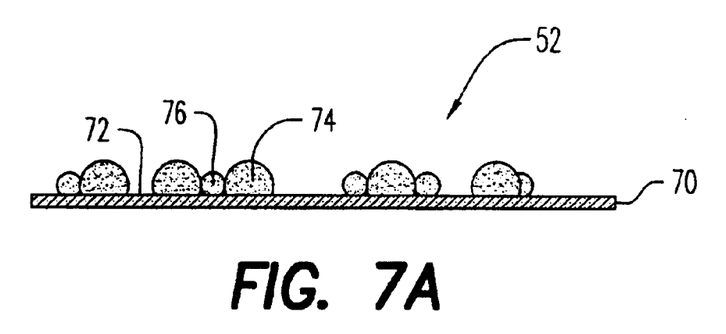
FIG. 7A is a magnified cross-sectional view of a preferred embodiment of the contaminant remover according to the present invention.

As shown is FIG. 7A, filter medium 52 is most preferably a composite structure formed by an adsorbent supporting web substrate 70 having a surface 72 fused to a mixture of adsorbent particles 74 and binder particles 76. Adsorbent particles 74 are coalesced or fused together by binder particles 76, which are interposed therebetween. Also, some of the binder particles are fused to surface 72. The composite structure is preferably obtained according to the method described in U.S. Pat. No. 5,792,513, issued on Aug. 11, 1998, which is incorporated in its entirety herein by reference. As described therein, a mixture of adsorbent particles 74 and binder particles 76 is applied to part or all of surface 72, thereby producing a loose powder coating on surface 72. The loose powder coating is heated to at least the Vicat softening temperature of binder particles 76, but below the melting temperature of adsorbent supporting substrate 70 and adsorbent particles 74. Pressure is applied to web substrate 70 to cause the softened binder particles to coalesce, or fuse together, adsorbent particles 74, as well as adhere adsorbent particles 74 to adsorbent supporting web substrate 70.

Filtration medium 52, as illustrated in FIG. 7A, comprises an adsorbent supporting web substrate 70 that may be formed preferably using non-woven fibrous materials, such as the spun-bonded polyesters and polyolefins. Woven substrates may also be used. Furthermore, adsorbent supporting web substrate 70 may optionally be formed using cellulosic materials, such as paper, or a combination of cellulosic and thermoplastic fibers.

Materials such as iodinated resin, activated carbon, activated alumina, alumina-silicates, ion-exchange resins, and manganese or iron oxides can be used as adsorbent particles 74.

Materials forming binder particles 76 typically include thermoplastics such polypropylene, linear low-density polyethylene, low density polyethylene and ethylene-vinyl acetate copolymer.

Figure 7B:
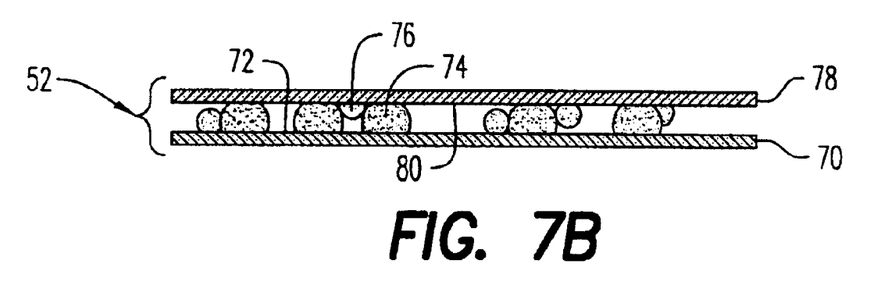
FIG. 7B is a magnified cross-sectional view of another preferred embodiment of the contaminant remover according to the present invention.

Referring to the embodiment in FIG. 7B, filter medium 52 can be modified to include an overlying web substrate 78, which could be formed of materials similar to supporting web substrate 70. Overlying web substrate 78 has a surface 80 facing coated surface 72 of adsorbent supporting web substrate 70. Adsorbent particles 74 may also be adhered to surface 80 of overlying web substrate 78 by binder particles 76. The fusing of adsorbent particles 74, supporting substrate 70, and overlying web substrate 78 can be accomplished according to the disclosure in U.S. Pat. No. 5,792,513. Essentially, after applying the mixture of adsorbent and binder particles to the surface of adsorbent supporting web substrate 70 to produce a powder coating covering at least a portion thereof, as described above, overlying web substrate 78 is applied over both adsorbent supporting web substrate 70 and the powder coating thereon. Heat and pressure is applied to adsorbent supporting web substrate 70 and overlying web substrate 78 to soften binder particles 76. The softened binder particles coalesce, or fuse together, adsorbent particles 74, as well as adhere adsorbent particles 74 to web substrates 70, 78.

Both the adsorbent supporting web substrate 70 and the overlying web substrate 78 may provide supplemental particulate filtration. For example, filter medium 52 can reduce certain waterborne oocysts when web substrate 70 and overlying web substrate 78 are composed of a fine hydrophilic particulate filter medium, potentially combined with adsorbents such as activated carbon and heavy metal adsorbing zeolites. Co-pending U.S. patent application Ser. No. 09/140,924, filed Aug. 27, 1998, and assigned to the assignee hereof describes a low flow resistance composite filter medium for capturing at least 99.95 percent of particulates of a size in the 3 to 4 micron range, such as oocysts, and dissolved chemical contaminants from a fluid that can be used as a high flow rate filter medium in the present invention. The subject matter of that application is incorporated herein by reference in its entirety.

During the operation of beverage brewing system 10, a liquid from liquid reservoir 14 flows through conduit 18 to heater 16. The liquid is heated and then passes through conduit 22 to outlet 20. After exiting outlet 20, the heated liquid passes through contaminant remover 33. Contaminant remover 33 removes contaminants, thereby creating a substantially pure, heated liquid. The substantially pure, heated liquid enters brew basket 28. Therein, the substantially pure, heated liquid mixes with the brewing ingredients. The resulting brewed beverage exits brew basket 28, enters collector 30, and is optionally kept warm by heating surface 32.

As can be seen from the foregoing detailed description and drawings, the present invention provides a beverage brewing system 10 that is adapted to hold contaminant remover 33 conveniently between outlet 20 and brew basket 28 permitting independent access to both contaminant remover 33, which is contained within separate supporting device 24, and brew basket 28. Such access is made possible via support assembly 26, which allows alternative movement between an operative position and an inoperative position. The user has convenient access to contaminant remover 33 when supporting device 24 is in the inoperative position. Thus, a user of beverage brewing system 10 may conveniently change contaminant remover 33 without interference from, or involvement with, brew basket 28. In addition, contaminant remover 33 is less likely to be lost or damaged because, once installed, it becomes an integrated part of beverage brewing system 10. Moreover, since contaminant remover 33 is not located within brew basket 28, it is unlikely to be contaminated with brewing ingredients.

Although beverage brewing system 10 has been described with respect to one or more particular embodiments, it will be understood that other embodiments of the present invention may be employed without departing from the spirit and scope of the present invention. Hence, the present invention is deemed limited only by the appended claims and the reasonable interpretation thereof.

We claim:

1. A system for brewing a beverage from a liquid comprising:
   a housing, said housing having associated therewith:
      source of brewing liquid;
      a region for accepting a holder for brewing ingredients; and
      a supporting device having an opening;
   a contaminant removing means removably placeable in said opening in said supporting device; and
   attachment means for attaching said supporting device to said housing so as to allow movement of said supporting device from a first position wherein said contaminant removing means is disposed so as to remove contaminants from liquid moving from said source to said region, to a second position wherein said contaminant removing means is disposed so as to allow said contaminant removing means to be placed in or removed from said supporting device.

2. The system of claim 1, wherein said supporting device is movable between said first position and said second position without involvement of a holder for brewing ingredients when such holder is in said region.

3. The system of claim 1, in combination with a holder for brewing ingredients.

4. The system of claim 1, wherein said supporting device and said contaminant removing means have mating portions which mate to produce a water tight seal when said contaminant removing means is placed in said supporting device.

5. The system of claim 1, wherein said attachment means attaches said supporting device to said housing in said second position.

6. The system of claim 1, wherein said contaminant removing means comprises a material selected from the group consisting of: metallic mesh screen, polymeric non-woven material, glass fiber, microporous membrane, paper, iodinated resin, activated carbon, activated alumina, alumina-silicates, ion-exchange resins, manganese oxides, iron oxides, zeolite, and combinations thereof.

7. The system of claim 1, wherein said contaminant removing means comprises a frame, said frame supporting at least one filter medium selected from the group,consisting of: metallic mesh screen, polymeric non-woven material, glass fiber, microporous membrane, paper, iodinated resin, activated carbon, activated alumina, alumina-silicates, ion-exchange resins, manganese oxides, iron oxides, zeolite, and combinations thereof.

8. The system of claim 7, wherein said frame is injection molded around said at least one filter medium.

9. The system of claim 8, wherein said frame comprises a thermoplastic material.

10. The system of claim 9, wherein said thermoplastic material is polyethylene.

11. The system of claim 1, wherein said attachment means comprises a hinge connecting said housing and said supporting device.

12. The system of claim 1, wherein said attachment means comprises at least one telescoping member.

13. The system of claim 1, wherein said attachment means comprises a sliding member that is received within said housing.

14. The system of claim 13, wherein said sliding member is releasably, slidingly fastened to said housing.

15. The system of claim 1, wherein said contaminant removing means comprises a filtration medium and a means for supporting said filtration medium.

16. The system of claim 15, wherein said contaminant removing means and said supporting device form a reservoir for said liquid when said contaminant removing means is in said opening in said supporting device.

17. The system of claim 15, wherein said contaminant removing means comprises a peripheral member and supporting members extending inwardly from said peripheral member.

18. The system of claim 1, wherein said contaminant removing means comprises a frame, said frame supporting at least one filter medium, and said filter medium comprises a composite filter element comprising a supporting substrate fused to a mixture of adsorbent particles and binder particles with said adsorbent particles being coalesced or fused together by at least a portion of the binder particles and at least a portion of the binder particles being coalesced or fused to the supporting substrate.

19. A method for using a system for brewing a beverage, the system having a housing, said housing having associated therewith a source of brewing liquid; and a region for accepting a holder for brewing ingredients; comprising the steps of:

removably positioning in an opening in a supporting device movably attached to said housing, a contaminant removing means for removing contaminants from said liquid, when said supporting device is in an initial position;

moving said supporting device so that said contaminant removing means is in a position between said source and a holder positioned in said region;

passing liquid from said source through the contaminant removing means to remove contaminants from said liquid and to thereby provide purified liquid;

passing said purified liquid into the holder to produce a brewed beverage; and collecting the brewed beverage produced in the holder in a collection container.

20. The method of claim 19, further comprising:

moving said supporting device to said initial position; and removing said removing means from said supporting device.

21. The method of claim 19, wherein said supporting device is positioned by a hinge.

22. The method of claim 19, wherein said supporting device is positioned by at least one telescoping member.

23. The method of claim 19, wherein said supporting device is positioned by a sliding member.

24. The method of claim 19, wherein the contaminant removing means comprises a composite filter element comprising a supporting substrate fused to a mixture of adsorbent particles and binder particles with at least a portion of said adsorbent particles being coalesced or fused together by at least a portion of the binder particles and at least a portion of the binder particles being coalesced or fused to the supporting substrate.

25. A process for producing an adsorbent filter element having a supporting frame, said process comprising the steps of:

forming an adsorbent filter medium comprising a supporting substrate coated with a composite mixture of adsorbent particles and binder particles, said composite mixture forming an adsorbent layer, wherein said binder particles are interposed between said adsorbent particles, whereby at least a portion of said binder particles coalesce or fuse at least a portion of said adsorbent particles together, and whereby at least a portion of said binder particles adhere said adsorbent particles to said supporting substrate;

forming an adsorbent filter element from said adsorbent filter medium; and forming a supporting frame around a periphery of said adsorbent filter element.

26. The process of claim 25, further comprising sealing a portion of said adsorbent filter medium by hot stamping said adsorbent filter medium.

27. The process of claim 26, wherein said forming said adsorbent filter element comprises cutting said adsorbent filter element about its periphery in the region where said adsorbent; filter medium was hot stamped.

28. The process of claim 27, wherein said adsorbent filter element is cut into an annular shape.

29. The process of claim 25, wherein said supporting frame is formed by a process selected from the group consisting of: injection molding and insert molding.

30. The process of claim 29, wherein said supporting frame comprises a thermoplastic material.

31. The process of claim 30, wherein said thermoplastic material is polyethylene.

32. A contaminant remover produced by the process of claim 25.

* * * * *